United States Patent
Camenisch et al.

(10) Patent No.: US 11,379,825 B2
(45) Date of Patent: ***Jul. 5, 2022

(54) ENABLEMENT OF PERFORMANCE OF A TRANSACTION

(71) Applicant: International Business Machines Corporation, Armonk, NY (US)

(72) Inventors: Jan L. Camenisch, Thalwil (CH); Abhi A. Shelat, Charlottesville, VA (US); Dieter M. Sommer, Zurich (CH); Roger D. Zimmermann, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 805 days.

This patent is subject to a terminal disclaimer.

(21) Appl. No.: 16/282,510

(22) Filed: Feb. 22, 2019

(65) Prior Publication Data

US 2019/0188690 A1 Jun. 20, 2019

Related U.S. Application Data (63) Continuation of application No. 14/337,279, filed on Jul. 22, 2014, now Pat. No. 10,296,900, which is a (Continued)

(30) Foreign Application Priority Data

Jun. 13, 2006 (EP) .................................. 06115368

(51) Int. Cl.
*G06Q 20/36* (2012.01)
*G06Q 20/38* (2012.01)
(Continued)

(52) U.S. Cl.
CPC ........... *G06Q 20/36* (2013.01); *G06F 3/0482* (2013.01); *G06F 3/04842* (2013.01);
(Continued)

(58) Field of Classification Search
CPC ............... G06Q 20/36; G06Q 20/3674; G06Q 20/3821; G06Q 20/383; G06F 3/0482;
(Continued)

(56) References Cited

U.S. PATENT DOCUMENTS 5,469,540 A * 11/1995 Powers, III ........... G06F 3/0481
715/791
5,812,668 A 9/1998 Weber
(Continued)

OTHER PUBLICATIONS

Basney et al. "Credential Wallets: A Classification of Credential Repositories Highlighting MyProxy", Aug. 31, 2003.*
(Continued)

*Primary Examiner* — Steven S Kim
(74) *Attorney, Agent, or Firm* — Schmeiser, Olsen & Watts, LLP; Rakesh Roy (57) ABSTRACT

A method and system for enabling performance of a transaction. A first representation of a transaction policy, which depicts transaction policy options for fulfilling the transaction policy is displayed by a client computer. After a user selects a first transaction policy option, the client computer displays a second representation of the transaction policy, depicting at least one mechanism pertaining to the first transaction policy option for satisfying the requirements of the first transaction policy option. After the user selects a first mechanism, the client computer displays evidence options for each requirement of the first transaction policy option. After the user selects an evidence option for each requirement of the first transaction policy option, the client computer sends to a server transaction enablement informa-
(Continued)

tion that includes evidence dictated by the selected evidence options to enable the server to perform the transaction.

20 Claims, 7 Drawing Sheets

Related U.S. Application Data continuation of application No. 11/760,026, filed on Jun. 8, 2007, now Pat. No. 8,825,554.

(51) Int. Cl.
| | |
|---|---|
| *G06F 3/0482* | (2013.01) |
| *G06F 21/33* | (2013.01) |
| *H04L 9/40* | (2022.01) |
| *G06F 3/04842* | (2022.01) |
| *H04L 67/10* | (2022.01) |

(52) U.S. Cl.
CPC ......... *G06F 21/33* (2013.01); *G06Q 20/3674* (2013.01); *G06Q 20/383* (2013.01); *G06Q 20/3821* (2013.01); *H04L 63/0823* (2013.01); *H04L 63/20* (2013.01); *H04L 67/10* (2013.01); *G06F 2221/2119* (2013.01)

(58) Field of Classification Search
CPC ............. G06F 3/04842; G06F 21/33; G06F 2221/2119; H04L 63/0823; H04L 63/20; H04L 67/10
See application file for complete search history.

(56) References Cited

U.S. PATENT DOCUMENTS

| | | | |
|---|---|---|---|
| 5,872,848 A | 2/1999 | Romney et al. | |
| 5,944,791 A | 8/1999 | Scherpbier | |
| 5,960,411 A | 9/1999 | Hartman et al. | |
| 5,963,924 A | 10/1999 | Williams et al. | |
| 6,016,484 A | 1/2000 | Williams et al. | |
| 6,029,151 A | 2/2000 | Nikander | |
| 6,119,108 A | 9/2000 | Holmes et al. | |
| 6,263,446 B1 | 7/2001 | Kausik et al. | |
| 6,304,974 B1 | 10/2001 | Samar | |
| 6,510,453 B1 | 1/2003 | Apfel et al. | |
| 6,804,705 B2 | 10/2004 | Greco et al. | |
| 6,928,623 B1 | 8/2005 | Sibert | |
| 7,155,411 B1 | 12/2006 | Blinn et al. | |
| 7,185,199 B2 | 2/2007 | Balfanz et al. | |
| 8,104,074 B2 | 1/2012 | Cameron | |
| 8,112,354 B2 | 2/2012 | Lalwani | |
| 8,150,767 B2 | 4/2012 | Wankmueller | |
| 8,825,554 B2 | 9/2014 | Camenisch et al. | |
| 9,519,894 B2 * | 12/2016 | Bishop ................ | G06Q 20/363 |
| 10,296,900 B2 * | 5/2019 | Camenisch ......... | G06F 3/04842 |
| 2003/0172090 A1 | 9/2003 | Asunmaa et al. | |
| 2004/0123138 A1 | 6/2004 | Le Saint | |
| 2004/0123144 A1 | 6/2004 | Chan et al. | |
| 2004/0128546 A1 | 7/2004 | Blakley et al. | |
| 2004/0168067 A1 | 8/2004 | Russikoff | |
| 2005/0027713 A1 | 2/2005 | Cameron et al. | |
| 2005/0114779 A1 | 5/2005 | Griesmer | |
| 2006/0101507 A1 | 5/2006 | Camenisch | |
| 2006/0165060 A1 | 7/2006 | Dua | |
| 2006/0179404 A1 | 8/2006 | Yolleck et al. | |
| 2006/0265740 A1 | 11/2006 | Clark et al. | |
| 2007/0011724 A1 | 1/2007 | Gonzalez et al. | |
| 2007/0038765 A1 | 2/2007 | Dunn | |
| 2007/0056018 A1 | 3/2007 | Ridlon et al. | |
| 2007/0056019 A1 | 3/2007 | Allen et al. | |
| 2014/0337754 A1 | 11/2014 | Camenisch et al. | |

OTHER PUBLICATIONS

Camenisch et al., Safer Web Identities via Private Credentials; {jca, abs, dso, zim}@zurich.ibm.com; May 22-26, 2006, Edinburgh, UK, 10 pages.
Notice of Allowance (dated Apr. 22, 2014) for U.S. Appl. No. 11/760,026, filed Jun. 8, 2007, Conf. No. 7308.
Examiner's Amendment (dated Apr. 16, 2014) for U.S. Appl. No. 11/760,026, filed Jun. 8, 2007, Conf. No 7308.
RCE (filed Feb. 7, 2011) for U.S. Appl. No. 11/760,026, filed Jun. 8, 2007, Conf. No. 7308.
Final Office Action (dated Nov. 5, 2010) for U.S. Appl. No. 11/760,026, filed Jun. 8, 2007, Conf. No 7308.
Amendment (filed Jun. 14, 2010) for U.S. Appl. No. 11/760,026, filed Jun. 8, 2007, Conf. No. 7308.
Office Action (dated Mar. 16, 2010) for U.S. Appl. No. 11/760,026, filed Jun. 8, 2007, Conf. No 7308.
Notice of Allowance (dated Jan. 4, 2019) for U.S. Appl. No. 14/337,279, filed Jul. 22, 2014.

* cited by examiner

ENABLEMENT OF PERFORMANCE OF A TRANSACTION

This application is a continuation application claiming priority to Ser. No. 14/337,279, filed Jul. 22, 2014, which is a continuation of Ser. No. 11/760,026, filed on Jun. 8, 2007, U.S. Pat. No. 8,825,554, issued Sep. 2, 2014.

FIELD OF THE INVENTION

The present invention is related to a method, a user interface, a computer system and a computer program product for performing transactions between a client and a server.

BACKGROUND OF THE INVENTION

The web is an interactive medium. Websites provide content to the user and users provide information to websites. This providing of content to the user can be in the context of a transaction such as the purchasing of some good or an authentication request. One approach to the solicitation of user input on the web is the use of Hypertext Markup Language (HTML) forms. HTML forms involve a webpage containing interface widgets which enable free-form text entry. In the case of authentication requests there are further methods known that are supported by the underlying transport protocols for HTML: Hypertext Transfer Protocol (HTTP)-based authentication and client-side certificates.

Data submitted in forms are error prone. It is not possible to send certified data through a web-form. The user can only enter free-form text. In addition, HTTP-based authentication has a further usability problem. In order to process a HTTP authentication request, the browser usually displays a popup window which cannot be dismissed until it is answered. This process takes control of the browser and prevents the browser from switching to different tabs or different sessions. When the user opens several (browsing) tabs, it is not clear which tab triggered the popup request.

Client-side certificates cannot be used for soliciting general attributes. In addition, the certificates inherently allow the website to track a user from session to session.

Thus, there is a need to provide improved solutions for performing transactions between a client and a server.

SUMMARY OF THE INVENTION

The present invention provides method for performing transactions between a client and a server, said method comprising:

sending, by the client to the server, a transaction request for performing a transaction;

receiving, by the client, a response from the server comprising a transaction policy or an address at which the transaction policy may retrieved by the client, said transaction policy specifying criteria for performing the transaction in accordance with the transaction request;

if the response comprises the address, then retrieving the transaction policy from the address, said retrieving being performed by the client;

displaying, by the client in a first window of a screen of a client device at the client, a first representation of the transaction policy, said first representation depicting a plurality of transaction policy options for fulfilling the transaction policy, each transaction policy option comprising at least one requirement for fulfilling the transaction policy;

responsive to selection by a user of a first transaction policy option of the plurality of transaction policy options, displaying by the client in a second window of the screen a second representation of the transaction policy, said second representation being specific to the first transaction policy option and depicting at least one mechanism pertaining to the first transaction policy option for satisfying the at least one requirement of the first transaction policy option;

responsive to selection by the user of a first mechanism of the at least one mechanism pertinent to the first transaction policy option, depicting by the client in the screen at least one evidence option for each requirement of the first transaction policy option for proving that each requirement of the first transaction policy option is satisfied, said at least one evidence option for each requirement of the first transaction policy option being specific to the first mechanism; and following selection by the user of an evidence option of the at least one evidence option for each requirement of the first transaction policy option, sending transaction enablement information from the client to the server, said transaction enablement information comprising evidence dictated by each selected evidence option, said evidence enabling performance of the transaction by the server.

The present invention provides improved solutions for performing transactions between a client and a server.

DETAILED DESCRIPTION OF THE INVENTION

The present invention is directed to a method, a user interface, a computer system and a computer program product for performing transactions between a client and server.

The following definitions aid in the understanding of the description of the invention.

(1) User or proving party: An entity whose identity is managed. The user or proving party may be an individual, but at least small businesses will often interact with other businesses just as individuals do (e.g., in travel booking and information gathering). In other cases, the proving party may be a hardware device that proves properties about itself or an intermediary party enriching communication by property proofs.

(2) Relying party: An entity such as, inter alia, an organization represented, for example, by a server, wherein the entity wants to know a name or attributes of a user or proving party. Organizations may include all of a person's communication partners such as banks, doctors, colleagues, Internet service providers and family.

(3) Identity provider: An entity that stores identity-related information for a person. This entity might be a bank, a certificate authority (CA), an Internet Service provider, etc. (4) Computer includes devices such as personal computers but also digital assistants, mobile phones and other electronic devices.

Figure 1:
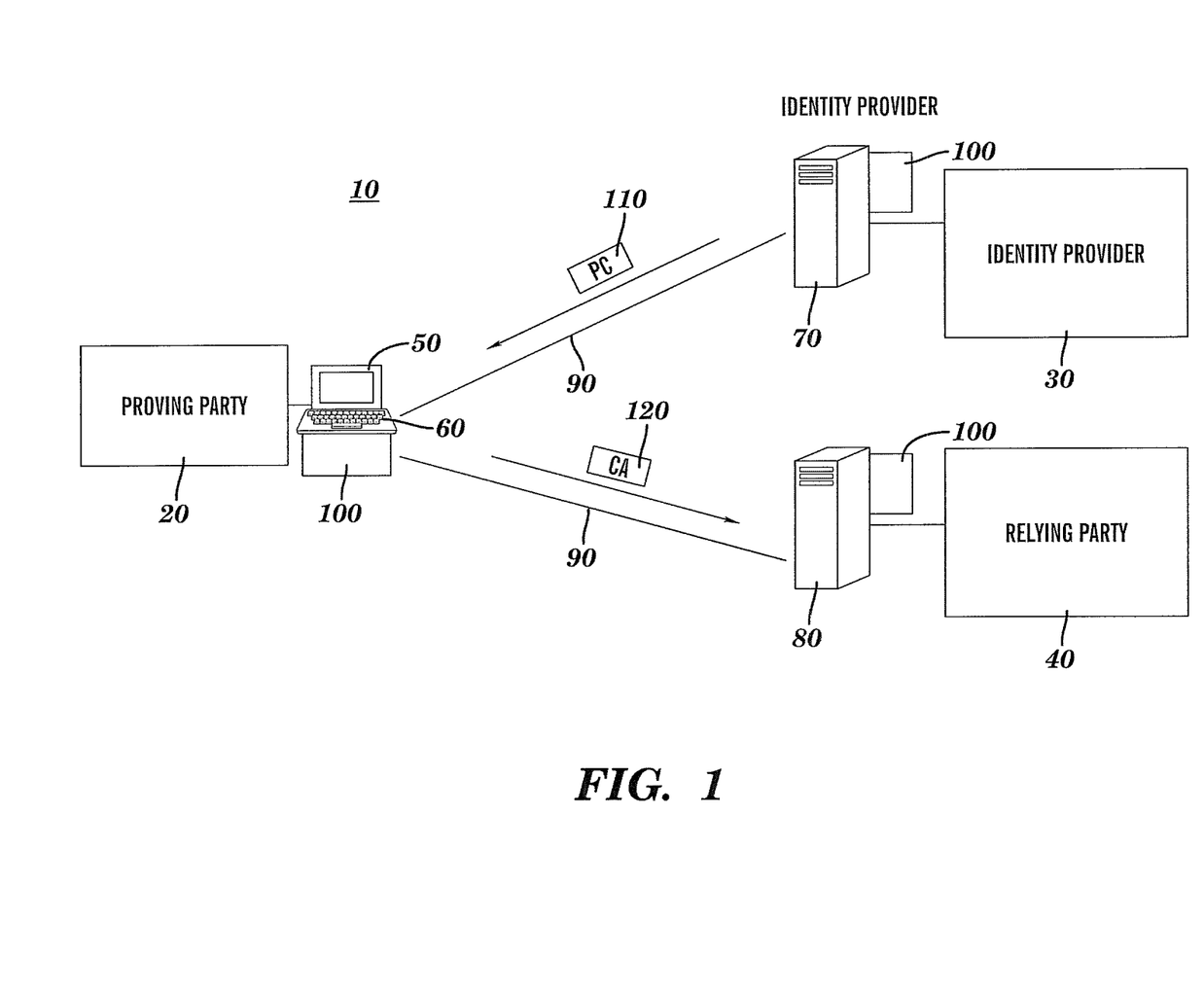
FIG. 1 shows a schematic illustration of a system according to embodiments of the present invention.

With reference to FIG. 1, the general layout of a system 10 according to an exemplary embodiment of the invention is described. The system 10 comprises a proving party 20, an identity provider 30, and a relying party 40. In this example, the proving party 20 is a user that wants to perform a transaction (e.g., a purchasing transaction or an authentication, with the relying party 40). The proving party 20 executes a client application 50 (e.g. a web browser) on a computer system 60 which may comprise a computer that is connected to the web. The identity provider 30 runs a server 70 and the relying party 40 runs a server 80 (e.g., a web server that can be accessed via the Internet and offers services via the web). The computer system 60 is connected to the server 70 of the identity provider 30 as well as to the server 80 of the relying party 40 via communication lines 90. The communication lines 90 may be provided through a network (e.g., the Internet). The identity provider 30 can be, for example, a bank or another professional organization which offers identity management services. The identity provider 30 is in general capable of issuing identity-related information (IRI). The term identity-related information IRI may include any information related to a person or user. Identity-related information IRI may comprise names, addresses, group memberships, authorization credentials, demographic data, personal preferences, calendar entries, medical and financial information, and everything else that may be stored digitally about a person or under a user name. The proving party 20 may desire such IRI for access control, authorization, personalization, authentication, login, commercial, medical, governmental, other issues, etc. The identity provider 30 provides for the issuance of attribute credentials, also denoted as private certificates or user certificates. The server 70 of the identity provider 30, the computer system 60 of the proving party 20, and the server 80 of the relying party 80 comprise a private certificate system plugin 100. This private certificate system plugin 100 enables the system 10 to work as a private certificate system. A private certificate system is a generalization of an anonymous credential system in that sophisticated assertions regarding attribute statements are supported. The proving party 20 may obtain one or more private certificates (PCs) 110 from the identity provider 30. The private certificates 110 may be stored locally on the computer 60 of the proving party 20. The proving party 20 can use the private certificates 110 to create certified assertions (CAs) 120. The certified assertions 120 comprise assertions with statements about attributes of the proving party 20 and a corresponding assertion proof. By means of sending these certified assertions 120 to the relying party 40, the proving party 20 can prove these assertions to the relying party 40 while staying completely anonymous and unlinkable. The proof for the assertions can be established by means of a non-interactive zero knowledge or a non-interactive minimum disclosure proof.

Figure 2:
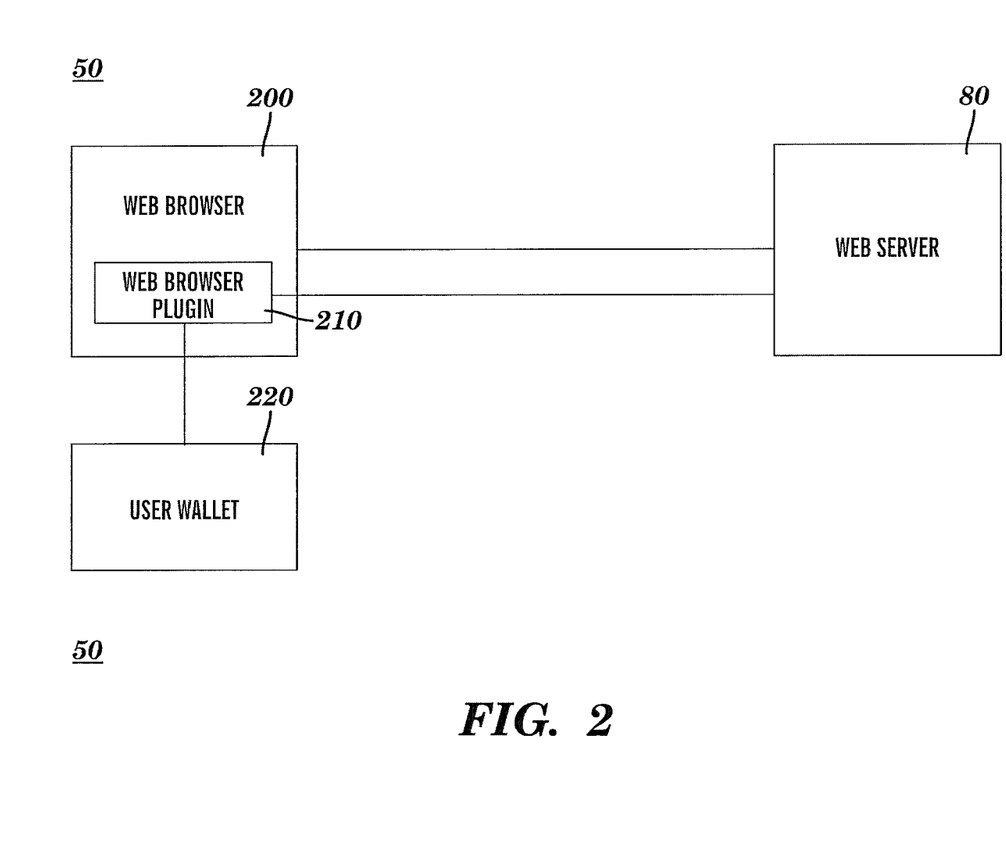
FIG. 2 shows a schematic illustration of selected parts of the system of FIG. 1 in more detail.

FIG. 2 discloses in more detail the client application 50 of FIG. 1 that is operable to perform a transaction with the server 80. The client application 50 comprises a browser 200 with a browser plugin 210. The browser plugin 210 is connected to a wallet 220. Furthermore, the browser plugin 210 and the web browser 200 are connected to the server 80. The wallet 220 stores and manages one ore more private certificates 110 of the client that have been received from the identity provider 30, wherein the wallet performs a comparison between the received transaction policy and the available certificates, and issues the certificates or certified assertions that may fulfill the transaction policy as transaction options. After having received the certificates, the user can perform identity transactions independently without contacting the identity provider.

A private certificate system is a generalization of an anonymous credential system in that sophisticated attribute statements are supported. A private certificate system allows for obtaining private certificates 110 from the identity provider 30 and the wallet 200 can use the private certificates 110 to make certified statements 120, both issuing and using being possible in a privacy-enhancing way. Private certificates 110 can have long lifetimes (e.g., multiple years). A private certificate 110, once obtained, is not sent to the relying party 40. Whenever the user needs to provide assertions with certified statements regarding attributes to the relying party 40, the wallet 220 uses one or multiple of the available private certificates 110 to release partial information on their third party-endorsed attributes in a controlled way. This release can be performed without involving the identity provider 30.

In one embodiment, the server of the relying party 40 signs the transaction policy that the server sends to the client. The wallet 220 may verify this signature and store the received transaction policy and the corresponding signature in a transaction log. This allows one to use the signed transaction policy in a later dispute. The result of the signature verification may be displayed to the user.

The scenario in FIGS. 1 and 2 is shown to facilitate the description of the following flows for performing transactions between the server 80 and the computer system 60. The computer system 60 functions as client for these transactions.

It should be noted that instead of the above described private certificate system, any kind of certification or credential system can be used. The wallet 220 may also be provided for using or supporting uncertified information as transaction enablement information.

Figure 3:
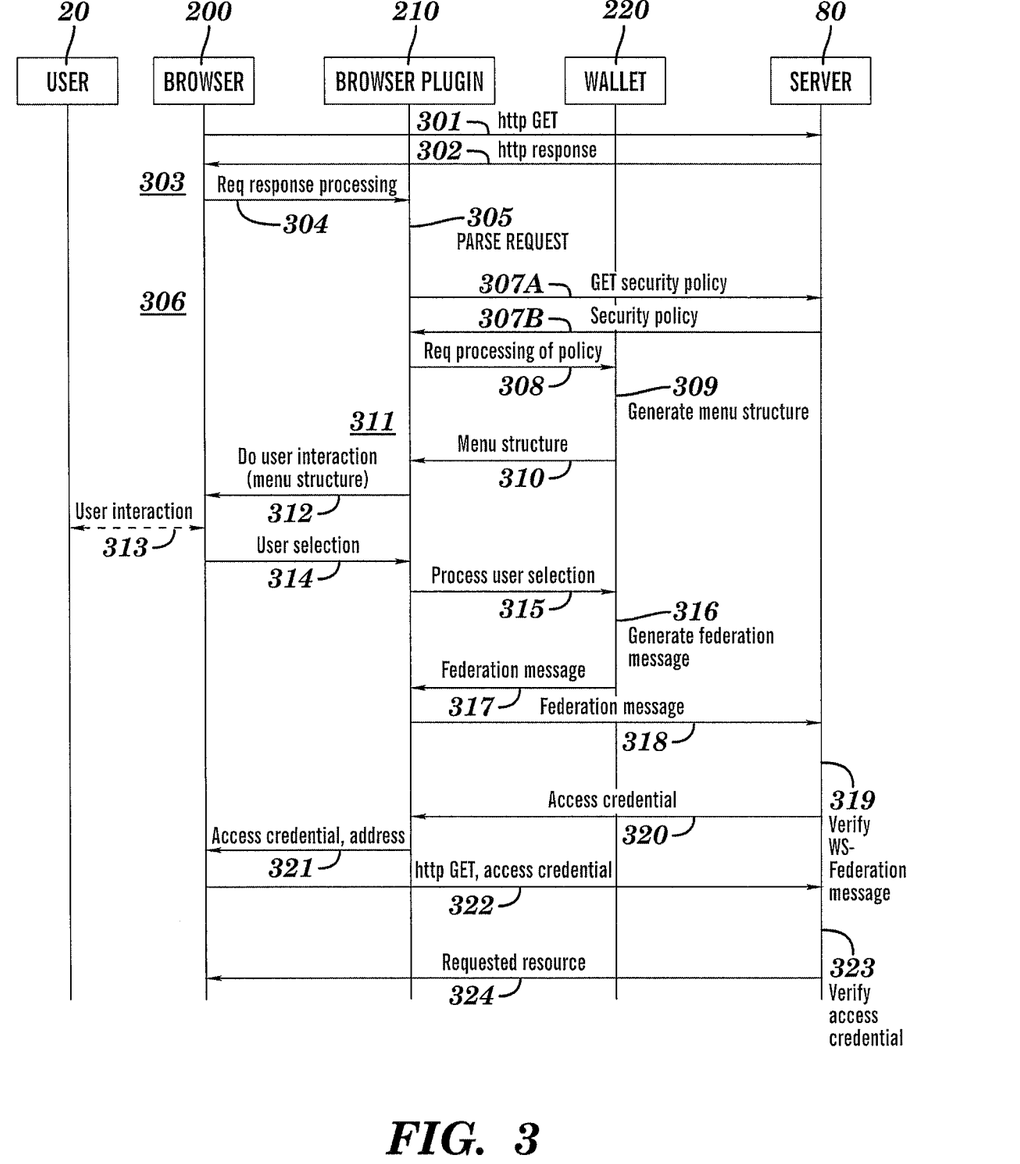
FIG. 3 shows a schematic illustration of the message flow of a method according to embodiments of the present invention.

FIG. 3 shows a schematic illustration of a message flow of an exemplary embodiment of the invention. The message flow between the browser 200, the browser plugin 210, the wallet 220 and the server 80, as well as additional steps, is depicted in FIG. 3. The flow is understood as being performed sequentially from top to bottom as indicated by the increasing reference numerals 301 to 324. However, it should be noted that there may be multiple instances of this protocol run in parallel without specified ordering.

In step 301, a transaction request for performing a transaction is sent to the server 80 from the browser 200 that is running on the computer system 60. Such a transaction request can be, for example, a purchasing request for purchasing an item, a request to access a restricted area of a resource (e.g., a restricted webpage of the server 80), or any other transaction request that requires additional information (e.g., certified information) from the client. In terms of format, the transaction request can be, for example, a GET-request according to the HTTP protocol.

In step 302, the server 80 sends a response back to the browser 200. The response comprises transaction policy information includes a transaction policy or an address at which the transaction policy may retrieved by the client (e.g., a web address that is indicating where the transaction policy can be retrieved from). The transaction policy is sent to the browser 200 in a first format (for example, the HTML format), and in a second format (for example, the XACML-format). The transaction policy specifies criteria for performing the transaction in accordance with the transaction request In step 303, the browser 200 displays a first representation of the transaction policy by means of the first format, for example by means of the HTML-format.

In step 304, the browser 200 sends a request to the browser plugin 210 for a processing of the response of the server 80.

In step 305, the browser plugin 210 parses the response of the server 80 to find location information that indicates where transaction management module activation elements should be placed. In addition, the browser plugin 210 parses the response of the server 80 to find the transaction policy or an address that indicates where the transaction policy can be retrieved from.

In step 306, the browser 200 displays one or more transaction management module activation elements in the first representation. The transaction management module activation elements may be optically highlighted, which improves user awareness and ease of use.

The steps 303-306 may be performed within such a short time that, for the observation of the user, the first representation appears to comprise the transaction management module activation elements from the beginning at step 303.

The transaction management module activation elements are linked to a transaction management module. Each of the transaction management module activation elements are allocated to a corresponding transaction policy option. For example, if there is a first, a second, and a third transaction policy option available for the respective transaction request, a first transaction management module activation element would be allocated to the first transaction policy option, a second transaction management module activation element would be allocated to the second transaction policy option, and a third transaction management module activation element would be allocated to the third transaction policy option.

Steps 307A and 307B are optional steps that are performed if the response that has been received in step 302 does not comprise the transaction policy, but rather an address (e.g., a web address) that is indicating where the transaction policy can be retrieved from. In this case there is sent by the browser plugin 210 in step 307A a request to receive this policy from the respective address indicating where the transaction policy can be retrieved from. This can be, for example, a GET-request according to the HTTP-format. In the further optional step 307B, the requested transaction policy is sent from the server hosting the respective address (which may be the server 80 or another server) to the browser plugin 210.

In step 308, the browser plugin 210 sends a request to the wallet 220 to process the transaction policy.

In step 309, the wallet 220 generates or computes respectively a transaction menu description comprising a menu structure of one or more policy transaction options. The wallet 220 performs a comparison between the received transaction policy and the available private certificates and issues transaction policy options in the menu structure that may be fulfilled with the private certificates available in the wallet 220. Each transaction policy option comprises at least one requirement for fulfilling the transaction policy.

For example, if there is a first, a second, and a third transaction policy option and corresponding first, second, and third transaction management module activation elements available for the transaction request, then a first transaction policy option description would be allocated to the first transaction policy option, a second transaction policy option description would be allocated to the second transaction policy option, and a third transaction policy option description would be allocated to the third transaction policy option.

In step 310, this transaction policy option descriptions with the menu structure is sent from the wallet 220 to the browser plugin 210.

In step 311, the browser plugin 210 uses the transaction policy option descriptions to pre-compute a visual representation of the transaction menu.

In step 312, the browser plugin 210 sends the pre-computed visual representation of the transaction menu to the browser 200.

In step 313, the user operates the browser 200. Responsive to activation of one of the transaction management module activation elements by the user, the browser 200 uses the transaction policy option descriptions in order to generate and display the second representation of the transaction policy. The second representation is specific to the selected transaction policy option associated with the selected transaction management module activation element. The second representation depicts a plurality of mechanisms for satisfying the at least one requirement of the selected transaction policy option.

Responsive to the user having selected a transaction policy option, a mechanism for satisfying the at least one requirement of the first transaction policy option, and an evidence option for selecting which evidence will be used to prove that each requirement is satisfied, the sending of transaction enablement information to the server is triggered. Such transaction enablement information comprises evidence (determined by the selected evidence option) sufficient for enabling performance of the transaction by the server. Such evidence may comprise, inter alia, a certified assertion 120 derived from the private certificates 110 of the user wallet 220. In one embodiment, the transaction enablement information is a certificate comprising one or more statements about the identity of a user.

Private certificates, also denoted as private attribute certificates or anonymous credentials, offer improved features with respect to the privacy of the user. A private certificate system makes it possible for a user to prove to an entity (e.g. to a website) that the user has a private certificate with specific properties without revealing the private certificate itself or any extra information. For example, if the user has a certificate about a private driver license from the state A, then the user can prove that the user is older than 18 and a resident of A without actually revealing the complete certificate.

The following steps 315-322 provide a detailed description of an exemplary embodiment of providing transaction enablement information to the server 80.

In step 315, the browser plugin 210 requests from the wallet 220 the generation of an authentication protocol message. This request includes the selected transaction policy option.

In step 316 the wallet 220 generates the authentication protocol message; e.g., a message according to the Web Services (WS)-Federation standard. The wallet 220 derives a certified assertion 120 for the selected transaction policy option from the available private certificates 110. This certified assertion 120 is included in the authentication protocol message.

In step 317, the authentication protocol message is returned by the wallet 220 to the browser plugin 210.

In step 318, the browser plugin 210 sends the authentication protocol message to the server 80.

In step 319, the server 80 verifies the received authentication protocol message. This means the server 80 checks the received certified assertion 120 by means of the private certificate system plugin 100.

Then, in step 320, the server 80 sends an access credential back to the browser plugin 210.

In step 321, the browser plugin 210 forwards the access credential to the browser 200 together with a request to re-request the initial transaction request. The initial transaction request is the request that was sent in step 301.

In step 322, the browser 200 sends the transaction request of step 301 again to the server 80 and includes the access credential in this request.

In step 323, the server 80 verifies the access credential with respect to the state of the server 80. If the verification by the server 80 is positive, the server 80 performs the requested transaction in step 324. In case of a request to access a restricted webpage, the server 80 sends this requested resource (e.g., the restricted webpage) associated with the requested transaction to the browser 200, and the browser 200 displays this requested resource to the user.

It is apparent to a skilled person in the art that the single message identity federation method according to the steps 315-317 could be performed by any interactive protocol.

It is further apparent, that the steps 320-324 can be replaced by other suitable mechanisms.

The exchange of the access credential in steps 320, 321 and 322 may be performed via a secure channel.

Figure 4:
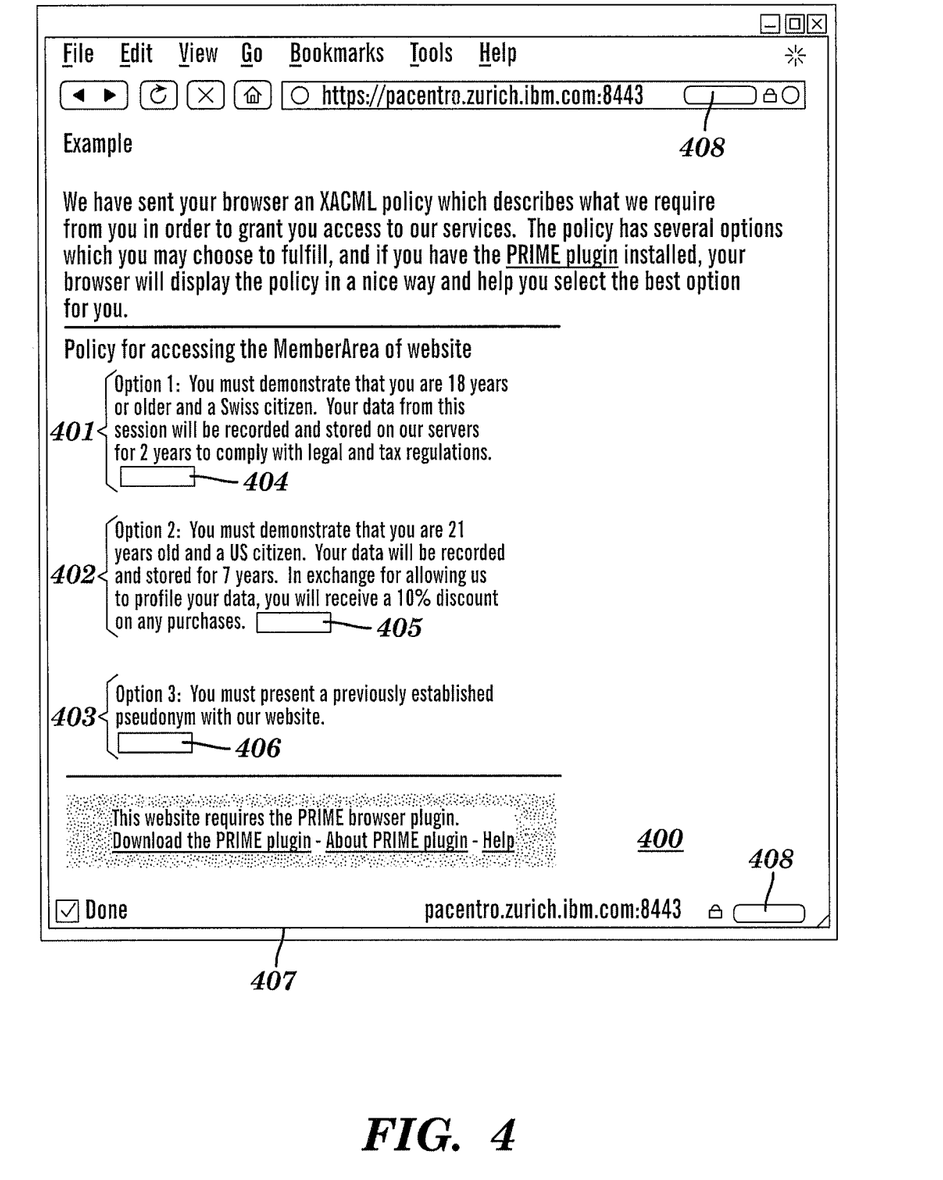
FIG. 4 shows an exemplary embodiment of a first representation of a transaction policy.

FIG. 4 shows an exemplary embodiment of a first representation 400 of a transaction policy. In the example of FIG. 4, the transaction policy is an access policy for accessing the member area of a website. This first representation of the transaction policy comprises a written description of the access policy. In this example, the transaction policy offers a first transaction policy option in a content area 401, a second transaction policy option in a content area 402, and a third transaction policy option in a content area 403. The content area 401 comprises a transaction management module activation element 404, the content area 402 comprises a transaction management module activation element 405, and the content area 403 comprises a transaction management module activation element 406. Each transaction policy option comprises at least one requirement for fulfilling the transaction policy, as indicated in content areas 401, 402, and 403.

The transaction management module activation elements 404, 405, and 406 may be implemented as buttons and are linked to the browser plugin 210 that performs the functionality of a transaction management module. The transaction management module activation elements 404, 405 and 406 can be activated by means of, inter alia, a mouse-click at the computer system 60.

The first representation of the access policy, including transaction policy options, is displayed in a first window 407. The first window 407 comprises status elements 408 that indicate the status of the transaction management module activation elements 404-406. If one of the transaction management module activation elements 404-406 have been activated, the status elements 408 indicates this visually to the user (e.g. by blinking).

Figure 5:
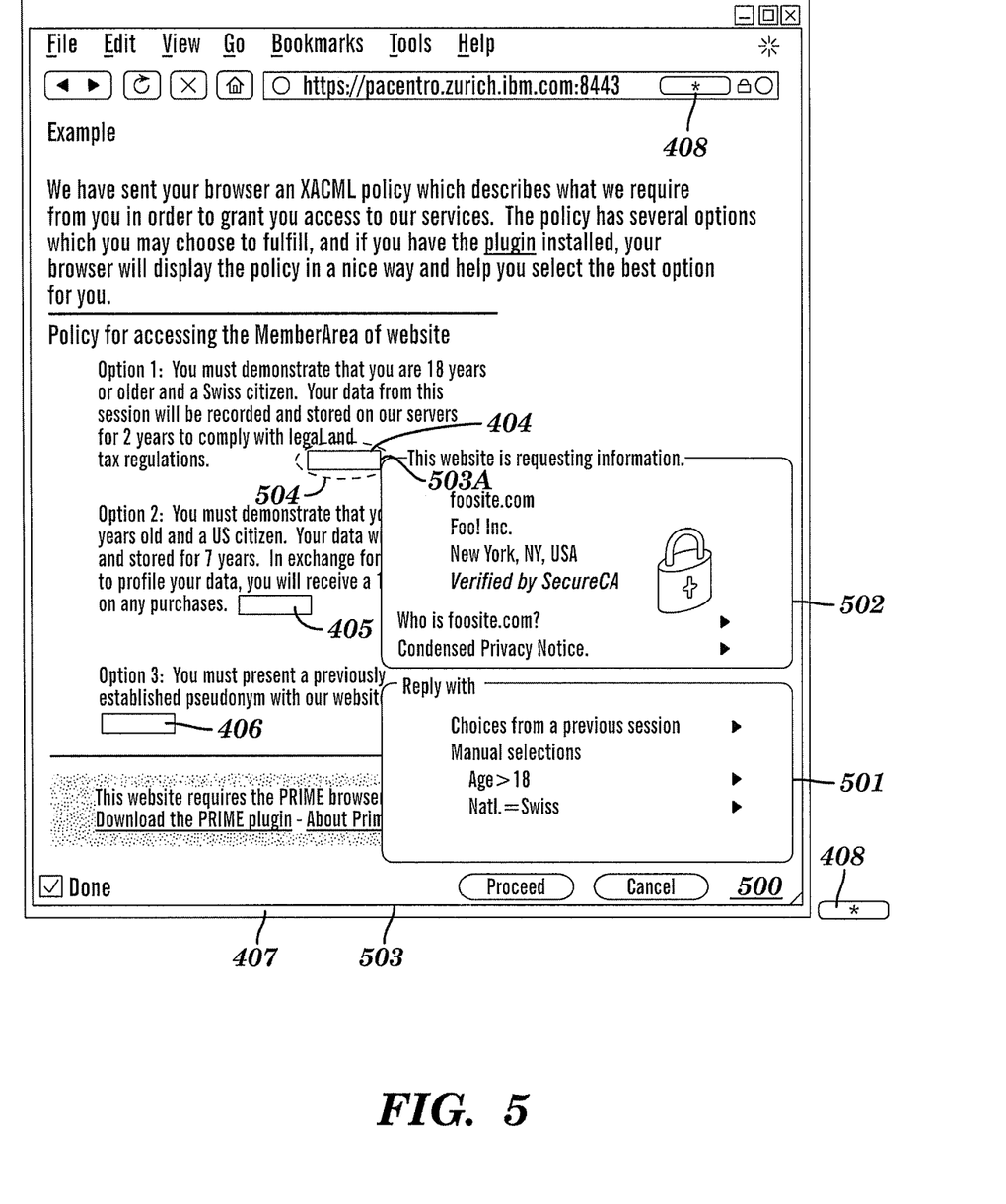
FIG. 5 shows an exemplary embodiment of a second representation of the transaction policy which is depicted as being overlayed on the first representation of FIG. 4.

FIG. 5 shows an exemplary embodiment of a second representation 500 of the transaction policy which is depicted as being overlayed on the first representation 400 of the transaction policy. In the example shown in FIG. 5, it is assumed that the user has activated the transaction management module activation element 404. Accordingly, the browser plugin 210 and the browser 200 have generated and displayed a mechanism menu 501. The second representation 500 comprises in addition an information menu 502 that offers the user additional information about the transaction policy, the website provider, or any other information that might be of interest to the user.

The second representation 500 of the access policy is displayed in a second window 503. The second representation 500 comprising the menu 501 is displayed with a visual tie to the transaction management module activation element 404. In this exemplary embodiment of the invention, the visual tie is established by means of placing the left upper corner 503A of the second window 503 just next to the transaction management module activation element 404, which creates a visual tie between the transaction management module activation element 404 and the second window 503. The visual tie is illustrated by means of a dashed circle 504. This dashed circle 504 illustrates that the user of the browser 200 recognizes visually that the displayed second window 503 belongs to the transaction management module activation element 404 and not to the other transaction management module activation elements 405 or 406 that are hidden under the second window 503. This improves the awareness of the user when the user operates the transaction module. In other words, the visual tie 504 offers the user a visual link between the second window 503 and the transaction management module activation element 404. In other words, the visual tie 504 offers the user a reference between the second window 503 and the corresponding transaction management module activation element 404. This reduces false or erroneous user transactions. This is particularly helpful when the user wants to perform several transactions in parallel. The user might, for example, want to compare the prices for a purchasing request with several providers in parallel. This means the user would like to check prices of the different providers in parallel with different identities (e.g. with different credit cards or other memberships to determine which provider grants the user the best price).

The second representation of the transaction policy improves the efficiency in terms of the screen space it uses by being displayed only when the transaction management module activation element is activated.

With the visual tie 504, the user can easily see which underlying transaction policy option (in this example the transaction policy option 1) is linked to the menu 501 that the user is currently operating. When the user decides to select a transaction policy option, the user is able to verify the relationship between the selected mechanism of the menu 501 and the corresponding transaction policy option in content area 401 by means of the visual tie 504. The selected mechanism from the menu 501 is a mechanism for satisfying the at least one requirement of the selected transaction policy option in content area 401.

The dashed circle 504 that illustrates the visual tie 504 is shown only for illustration purposes and may not be displayed as such in the second representation 500. However, it is possible to enhance the visual tie 504 by means of actually displaying circles or other graphical elements that connect the second window 503 and the corresponding transaction management module activation element 404.

Thus, the second representation is specific, in conjunction with the visual tie 504, to the selected transaction policy option associated with the selected transaction management module activation element.

As in FIG. 4 when the transaction management module activation element 404 is activated, the status elements 408 indicate this by an indication (e.g., blinking) to the user which may be illustrated by means of stars in the pertinent status element 408.

The menu 501 of the second representation comprises a menu structure that offers the user a plurality of mechanisms (Choices from a previous session, Manual selections) for satisfying the at least one requirement (age at least 18 and Swiss citizen) of the selected transaction policy option in content area 401 associated with the transaction management module activation element 404.

Figure 6:
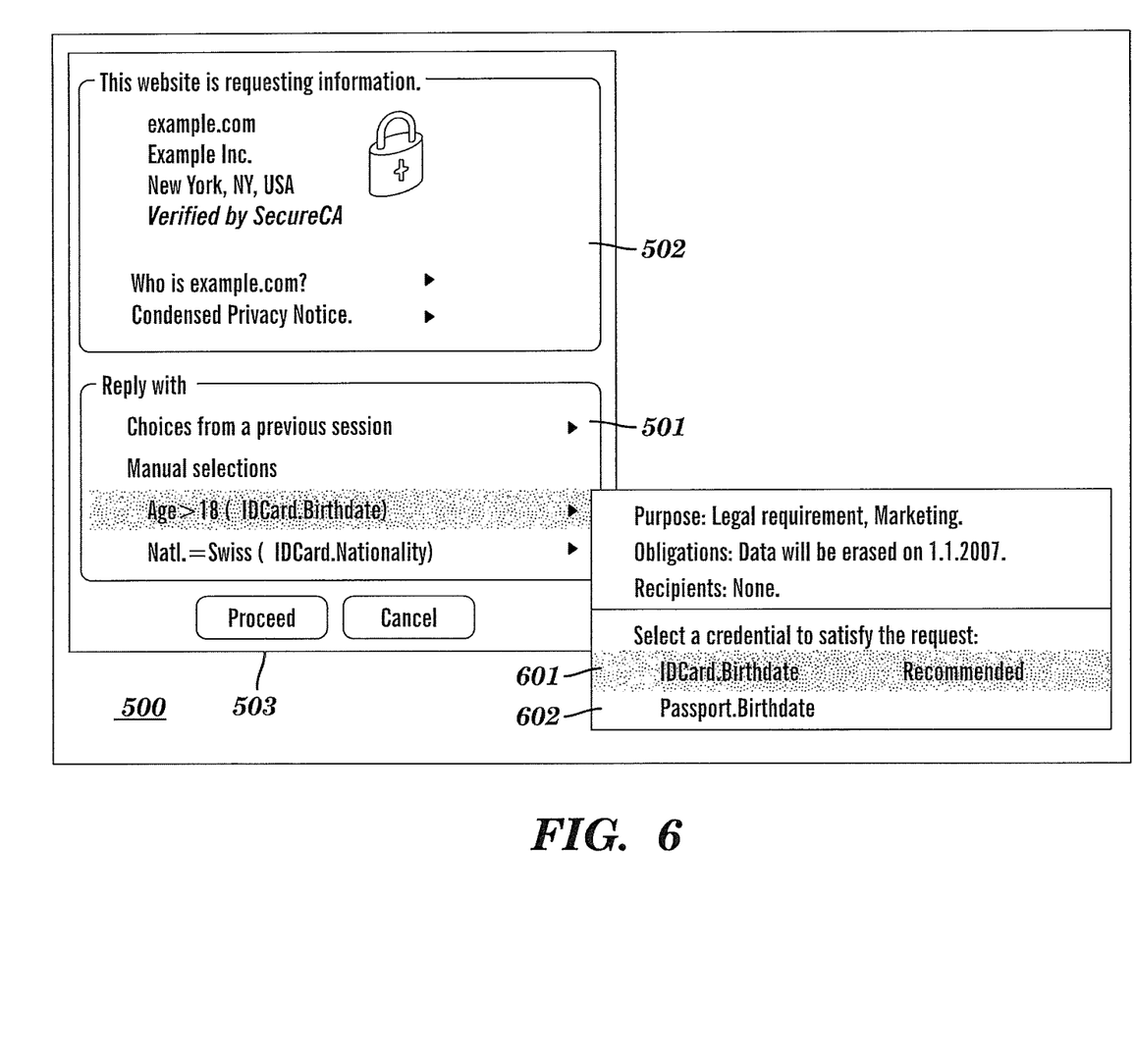
FIG. 6 illustrates the second representation of FIG. 5 in more detail.

FIG. 6 illustrates the second representation 500 comprising the menu 501 of FIG. 5 in more detail. In this example the transaction policy of the selected first transaction policy option specifies that the user has selected the Manual Selections mechanism to demonstrate the requirements that the user is 18 years or older and a Swiss citizen. The menu 501 in FIG. 6 offers several evidence options for demonstrating that these requirements are satisfied The transaction policy option, which in this example is the transaction requirement "18 years or older", can be demonstrated with evidence option 601 or evidence option 602. Generally, the menu 501 offers evidence options such as the payment with different credit cards or the proof of an identity with different identity documents such as identity cards, passports, or driver licenses.

Evidence option 601 offers the user the possibility to prove this requirement of the transaction policy by means of deriving a certified assertion, also denoted as credential, which states that the user is 18 years or older from the user's private certificate "ID-card". Evidence option 602 offers the user the possibility to prove this requirement of the transaction policy by means of deriving a certified assertion which states that the user is 18 years or older from the user's passport. In the example shown in FIG. 6, the user has selected the evidence option 601 which is visually indicated by means of the tick before the evidence option 601 and by means of the text in brackets "(IDCard.Birthdate)" behind the transaction requirement "Age≥18". As another example, the text "IDCard.Birthdate" could be presented visually to the user by means of an icon representing the ID-card.

In a corresponding way, the user can select evidence to demonstrate that the user is a Swiss citizen. Suitable certified assertions could be derived as well from the private certificates "ID-card" or "passport".

In the example of FIG. 6, if the user has chosen the private certificate "ID-card" to prove the second requirement (Swiss citizen) of the transaction policy, this is displayed in brackets after the transaction policy requirements "Nationality=Swiss" of the menu 501.

Figure 7:
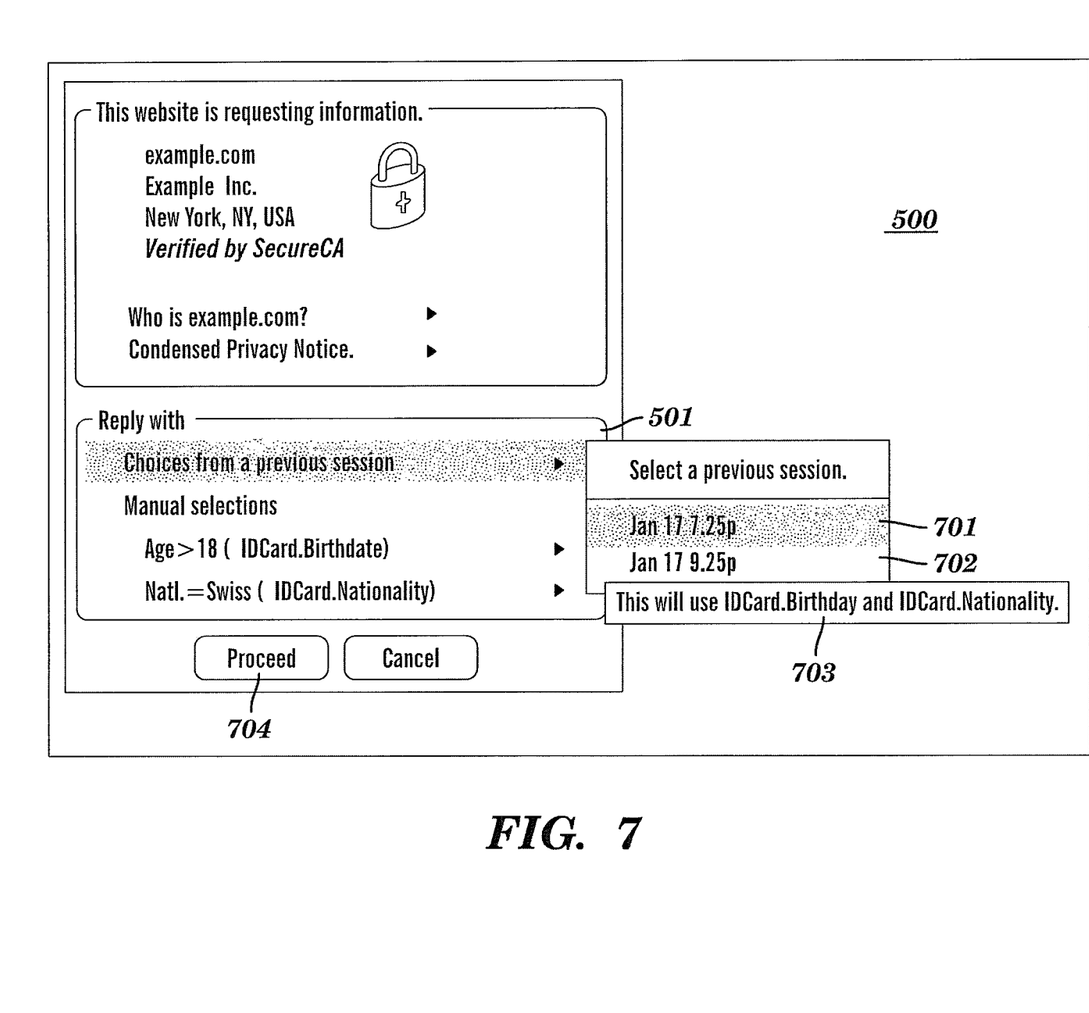
FIG. 7 illustrates another detail of the second representation of FIG. 5.

FIG. 7 illustrates another detail of the second representation 500 of FIG. 5. In this illustration, the user has chosen to fulfill the first transaction policy of the content area 401 with a choice from a previous session. The menu 501 in FIG. 7 offers evidence option 701 from a previous session of January 17 at 7.25 PM and evidence option 702 of January 17, 9.25 PM to prove that both requirements of the first transaction policy are satisfied.

In the example of FIG. 7 the user has chosen evidence option 701. The menu 501 displays in an additional box 703 that the selected evidence option 701 will prove both requirements of the first transaction policy by means of deriving a certified assertion from the private certificate "IDCard" which states that the age of the user is 18 years or older and that the user has the Swiss nationality.

After the user has selected at least one evidence option (i.e. after the user has selected by means of which certified assertions the user would like to fulfill the transaction policy), the user can trigger the sending of transaction enablement information to the server 80 by issuing a proceed directive (e.g., by clicking on the proceed button 704). The transaction enablement information comprises evidence associated with the selected at least one evidence option, said evidence being sufficient for enabling performance of the transaction by the server 80. In this example the transaction enablement information comprises the evidence of the certified assertion derived from the private certificate "IDCard" which states that the age of the user is 18 years or older and that the user has the Swiss nationality.

Any disclosed embodiment may be combined with one or several of the other embodiments shown and/or described. This is also possible for one or more features of the embodiments.

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In one embodiment, the invention is implemented in software, which includes but is not limited to firmware, resident software, microcode, etc.

In one embodiment, there is provided a computer program comprising instructions for carrying out the steps of the method when said computer program is executed on a computer system.

In one embodiment, there is provided a computer system comprising a computer for carrying out the steps of the method.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for enabling performance of a transaction, said method comprising:

receiving, by a client computer, a selection, from a user at the client computer, of a first transaction policy option of a plurality of transaction policy options for fulfilling a transaction policy, each transaction policy option comprising at least one requirement for fulfilling the transaction policy, a first representation of the transaction policy being displayed in a first window of a screen of the client computer;

in response to said receiving the selection of the first transaction policy option, said client computer displaying in a second window of the screen a second representation of the transaction policy such that the second representation in the second window is overlayed on the first representation in the first window, said second representation being associated with the first transaction policy option and simultaneously displaying an information menu and a mechanism menu in different non-overlapping portions of the screen, said information menu offering the user information about the transaction policy, said mechanism menu depicting at least one mechanism pertaining to only the first transaction policy option for satisfying a first requirement of at least one requirement of the first transaction policy option;

said client computer receiving a selection, from the user, of a first mechanism of the depicted at least one mechanism pertinent to the first transaction policy option and in response, said client computer displaying in a third window of the screen at least one evidence option for proving that the first requirement is satisfied, said third window overlaying a portion of the second window; and said client computer receiving a selection, from the user, of an evidence option of the depicted at least one evidence option for each requirement of the first transaction policy option and in response, said client computer receiving, from a wallet, evidence dictated by the selected evidence option and sending transaction enablement information to a server, said transaction enablement information comprising the evidence, said evidence enabling performance of the transaction by the server.

2. The method of claim 1, wherein the representation depicts the plurality of transaction policy options for fulfilling the transaction policy together with a respectively associated plurality of transaction management module activation elements that comprise a first transaction management module activation element that is activated, and wherein the second representation is displayed in the second window with a visual tie to the first transaction management module activation element displayed in the first representation in the first window, said first window comprising a visual indication that the first transaction management module activation element is activated to denote said selection by the user of the first transaction policy option, said second representation being displayed only while the first transaction management module activation element is activated.

3. The method of claim 1, said method further comprising prior to said displaying the first representation of a transaction policy:

said client computer sending the transaction request to the server for performing the transaction;

said client computer receiving from the server, a response to the transaction request, said response comprising the transaction policy or an address at which the transaction policy may be retrieved by the client computer from storage at the address, said transaction policy specifying criteria for performing the transaction in accordance with the transaction request;

said client computer determining whether the response comprises the transaction policy or the address;

if the client computer determines that the response comprises the transaction policy, then said client computer retrieving the transaction policy from the response;

if the client computer determines that the response comprises the address, then said client computer retrieving the transaction policy from the storage at the address.

4. The method of claim 3, wherein a browser plugin is plugged into a browser comprised by the client computer and is coupled to the wallet comprised by the client computer, wherein the browser performs said sending the transaction request to the server, and wherein the method comprises:

prior to said sending the transaction request to the server, said wallet receiving, from an identity provider that is distinct from the server, private certificates comprising anonymous credentials of the user and said wallet storing the received private certificates in the client computer, wherein none of said private certificates are sent to the server after said receiving the private certificates from the identity provider;

after said receiving the response, said browser sending a processing request to the browser plugin to process the response;

said browser plugin receiving the processing request sent by the browser;

in response to said receiving the processing request, said browser plugin parsing the response to determine where in the first representation to place the transaction management module activation elements during said displaying the first representation of the retrieved transaction policy.

5. The method of claim 4, wherein the selected evidence option is a certified assertion, and wherein said sending transaction enablement information to the server comprises:

said wallet receiving from the browser plugin a request for an authentication protocol message, said request for the authentication protocol message including the selected first transaction policy option;

responsive to said receiving the request for the authentication protocol message, said wallet generating, from the private certificates stored in the client computer and based on a comparison between the selected first transaction policy option and the private certificates stored in the client computer, a certified assertion for the selected first transaction policy option;

said wallet generating the authentication protocol message that includes the certified assertion generated by the wallet;

said browser plugin receiving, from the wallet, the generated authentication protocol message that comprises the certified assertion;

after said receiving the authentication protocol message, said browser plugin sending the authentication protocol message to the server;

said browser plugin receiving from the server an access credential reflective of the server having checked the certified assertion in the authentication protocol message received by the server from the browser plugin;

after said receiving the access credential, said browser plugin sending, to the browser, the access credential together with a request to resend the transaction request to the server; and said browser plugin resending the transaction request to the server such that the transaction request being resent further comprises the access credential, to enable the server to perform the transaction in response to the server verifying the access credential in the resent transaction request.

6. The method of claim 1, wherein the evidence comprises one or more statements about the identity of the user.

7. The method of claim 1, wherein the evidence comprises a certified assertion derived from a private certificate.

8. The method of claim 1, wherein the first mechanism is recited in the second representation as being a mechanism used at a previous session.

9. The method of claim 1, wherein the at least one evidence option comprises a plurality of evidence options, said evidence options denoting dates of respective previous sessions in which evidence pertaining to the first transaction policy option for satisfying the at least one requirement of the first transaction policy option was utilized.

10. The method of claim 1, wherein the transaction request is a request to access a restricted area of a resource of the server.

11. A computer program product, comprising a computer readable hardware storage device having computer readable program code stored therein, said computer readable program code which, upon being executed by a client computer, performs a method for enabling performance of a transaction, said method comprising:

said client computer receiving a selection, from a user at the client computer, of a first transaction policy option of a plurality of transaction policy options for fulfilling a transaction policy, each transaction policy option comprising at least one requirement for fulfilling the transaction policy, a first representation of the transaction policy being displayed in a first window of a screen of the client computer;

in response to said receiving the selection of the first transaction policy option, said client computer displaying in a second window of the screen a second representation of the transaction policy such that the second representation in the second window is overlayed on the first representation in the first window, said second representation being associated with the first transaction policy option and simultaneously displaying an information menu and a mechanism menu in different non-overlapping portions of the screen, said information menu offering the user information about the transaction policy, said mechanism menu depicting at least one mechanism pertaining to only the first transaction policy option for satisfying a first requirement of at least one requirement of the first transaction policy option;

said client computer receiving a selection, from the user, of a first mechanism of the depicted at least one mechanism pertinent to the first transaction policy option and in response, said client computer displaying in a third window of the screen at least one evidence option for proving that the first requirement is satisfied, said third window overlaying a portion of the second window; and said client computer receiving a selection, from the user, of an evidence option of the depicted at least one evidence option for each requirement of the first transaction policy option and in response, said client computer receiving, from a wallet, evidence dictated by the selected evidence option and sending transaction enablement information to a server, said transaction enablement information comprising the evidence, said evidence enabling performance of the transaction by the server.

12. The computer program product of claim 11,
wherein the representation depicts the plurality of transaction policy options for fulfilling the transaction policy together with a respectively associated plurality of transaction management module activation elements that comprise a first transaction management module activation element that is activated, and
wherein the second representation is displayed in the second window with a visual tie to the first transaction management module activation element displayed in the first representation in the first window, said first window comprising a visual indication that the first transaction management module activation element is activated to denote said selection by the user of the first transaction policy option, said second representation being displayed only while the first transaction management module activation element is activated.

13. The computer program product of claim 11, said method further comprising prior to said displaying the first representation of a transaction policy:
said client computer sending the transaction request to the server for performing the transaction;
said client computer receiving from the server, a response to the transaction request, said response comprising the transaction policy or an address at which the transaction policy may be retrieved by the client computer from storage at the address, said transaction policy specifying criteria for performing the transaction in accordance with the transaction request;
said client computer determining whether the response comprises the transaction policy or the address;
if the client computer determines that the response comprises the transaction policy, then said client computer retrieving the transaction policy from the response;
if the client computer determines that the response comprises the address, then said client computer retrieving the transaction policy from the storage at the address.

14. The computer program product of claim 13, wherein a browser plugin is plugged into a browser comprised by the client computer and is coupled to the wallet comprised by the client computer, wherein the browser performs said sending the transaction request to the server, and wherein the method comprises:
prior to said sending the transaction request to the server, said wallet receiving, from an identity provider that is distinct from the server, private certificates comprising anonymous credentials of the user and said wallet storing the received privates certificates in the client computer, wherein none of said private certificates are sent to the server after said receiving the private certificates from the identity provider;
after said receiving the response, said browser sending a processing request to the browser plugin to process the response;
said browser plugin receiving the processing request sent by the browser;
in response to said receiving the processing request, said browser plugin parsing the response to determine where in the first representation to place the transaction management module activation elements during said displaying the first representation of the retrieved transaction policy.

15. The computer program product of claim 14, wherein the selected evidence option is a certified assertion, and wherein said sending transaction enablement information to the server comprises:
said wallet receiving from the browser plugin a request for an authentication protocol message, said request for the authentication protocol message including the selected first transaction policy option;
responsive to said receiving the request for the authentication protocol message, said wallet generating, from the private certificates stored in the client computer and based on a comparison between the selected first transaction policy option and the private certificates stored in the client computer, a certified assertion for the selected first transaction policy option;
said wallet generating the authentication protocol message that includes the certified assertion generated by the wallet;
said browser plugin receiving, from the wallet, the generated authentication protocol message that comprises the certified assertion;
after said receiving the authentication protocol message, said browser plugin sending the authentication protocol message to the server;
said browser plugin receiving from the server an access credential reflective of the server having checked the certified assertion in the authentication protocol message received by the server from the browser plugin;
after said receiving the access credential, said browser plugin sending, to the browser, the access credential together with a request to resend the transaction request to the server; and
said browser plugin resending the transaction request to the server such that the transaction request being resent further comprises the access credential, to enable the server to perform the transaction in response to the server verifying the access credential in the resent transaction request.

16. A computer system comprising a client computer, said client computer comprising a processor and a computer readable memory unit coupled to the processor, said memory unit containing instructions that when executed by the processor, performs a method for enabling performance of a transaction, said method comprising:
said client computer receiving a selection, from a user at the client computer, of a first transaction policy option of a plurality of transaction policy options for fulfilling a transaction policy, each transaction policy option comprising at least one requirement for fulfilling the transaction policy, a first representation of the transaction policy being displayed in a first window of a screen of the client computer;
in response to said receiving the selection of the first transaction policy option, said client computer displaying in a second window of the screen a second representation of the transaction policy such that the second representation in the second window is overlayed on the first representation in the first window, said second representation being associated with the first transaction policy option and simultaneously displaying an information menu and a mechanism menu in different non-overlapping portions of the screen, said information menu offering the user information about the transaction policy, said mechanism menu depicting at least one mechanism pertaining to only the first transaction policy option for satisfying a first requirement of at least one requirement of the first transaction policy option;

said client computer receiving a selection, from the user, of a first mechanism of the depicted at least one mechanism pertinent to the first transaction policy option and in response, said client computer displaying in a third window of the screen at least one evidence option for proving that the first requirement is satisfied, said third window overlaying a portion of the second window; and said client computer receiving a selection, from the user, of an evidence option of the depicted at least one evidence option for each requirement of the first transaction policy option and in response, said client computer receiving, from a wallet, evidence dictated by the selected evidence option and sending transaction enablement information to a server, said transaction enablement information comprising the evidence, said evidence enabling performance of the transaction by the server.

17. The computer system of claim 16,
wherein the representation depicts the plurality of transaction policy options for fulfilling the transaction policy together with a respectively associated plurality of transaction management module activation elements that comprise a first transaction management module activation element that is activated, and
wherein the second representation is displayed in the second window with a visual tie to the first transaction management module activation element displayed in the first representation in the first window, said first window comprising a visual indication that the first transaction management module activation element is activated to denote said selection by the user of the first transaction policy option, said second representation being displayed only while the first transaction management module activation element is activated.

18. The computer system of claim 16, said method further comprising prior to said displaying the first representation of a transaction policy:
said client computer sending the transaction request to the server for performing the transaction;
said client computer receiving from the server, a response to the transaction request, said response comprising the transaction policy or an address at which the transaction policy may be retrieved by the client computer from storage at the address, said transaction policy specifying criteria for performing the transaction in accordance with the transaction request;
said client computer determining whether the response comprises the transaction policy or the address;
if the client computer determines that the response comprises the transaction policy, then said client computer retrieving the transaction policy from the response;
if the client computer determines that the response comprises the address, then said client computer retrieving the transaction policy from the storage at the address.

19. The computer system of claim 18, wherein a browser plugin is plugged into a browser comprised by the client computer and is coupled to the wallet comprised by the client computer, wherein the browser performs said sending the transaction request to the server, and wherein the method comprises:
prior to said sending the transaction request to the server, said wallet receiving, from an identity provider that is distinct from the server, private certificates comprising anonymous credentials of the user and said wallet storing the received private certificates in the client computer, wherein none of said private certificates are sent to the server after said receiving the private certificates from the identity provider;
after said receiving the response, said browser sending a processing request to the browser plugin to process the response;
said browser plugin receiving the processing request sent by the browser;
in response to said receiving the processing request, said browser plugin parsing the response to determine where in the first representation to place the transaction management module activation elements during said displaying the first representation of the retrieved transaction policy.

20. The computer system of claim 19, wherein the selected evidence option is a certified assertion, and wherein said sending transaction enablement information to the server comprises:
said wallet receiving from the browser plugin a request for an authentication protocol message, said request for the authentication protocol message including the selected first transaction policy option;
responsive to said receiving the request for the authentication protocol message, said wallet generating, from the private certificates stored in the client computer and based on a comparison between the selected first transaction policy option and the private certificates stored in the client computer, a certified assertion for the selected first transaction policy option;
said wallet generating the authentication protocol message that includes the certified assertion generated by the wallet;
said browser plugin receiving, from the wallet, the generated authentication protocol message that comprises the certified assertion;
after said receiving the authentication protocol message, said browser plugin sending the authentication protocol message to the server;
said browser plugin receiving from the server an access credential reflective of the server having checked the certified assertion in the authentication protocol message received by the server from the browser plugin;
after said receiving the access credential, said browser plugin sending, to the browser, the access credential together with a request to resend the transaction request to the server; and
said browser plugin resending the transaction request to the server such that the transaction request being resent further comprises the access credential, to enable the server to perform the transaction in response to the server verifying the access credential in the resent transaction request.

* * * * *